(12) United States Patent
Ayasse et al.

(10) Patent No.: US 8,501,135 B1
(45) Date of Patent: Aug. 6, 2013

(54) PROCESS FOR THE REMOVAL OF SULFUR COMPOUNDS FROM GAS STREAMS

(75) Inventors: Alan Ayasse, Calgary (CA); Ahmed M. Shahin, Airdrie (CA); Conrad Ayasse, Calgary (CA)

(73) Assignee: Archon Technologies Ltd., Calgary (CA)

( * ) Notice: Subject to any disclaimer, the term of this patent is extended or adjusted under 35 U.S.C. 154(b) by 0 days.

(21) Appl. No.: 13/545,920

(22) Filed: Jul. 10, 2012

(30) Foreign Application Priority Data

Feb. 17, 2012 (CA) .................................. 2768359
Feb. 17, 2012 (CA) .................................. 2769060

(51) Int. Cl.
| | | |
|---|---|---|
| *B01D 53/48* | (2006.01) | |
| *B01D 53/50* | (2006.01) | |
| *B01D 53/52* | (2006.01) | |
| *B01D 53/74* | (2006.01) | |
| *B01D 53/75* | (2006.01) | |

(52) U.S. Cl.
USPC ............ 423/242.1; 423/564; 423/574.1; 423/244.01; 423/243.01; 423/228; 423/573.1; 422/168; 422/169; 422/170; 422/172; 422/177; 422/187

(58) Field of Classification Search
USPC ............. 423/564, 574.1, 244.01, 243.01, 423/242.1, 228, 573.1; 422/168, 169, 170, 422/172, 177, 187
See application file for complete search history.

(56) References Cited

U.S. PATENT DOCUMENTS

| | | | | |
|---|---|---|---|---|
| 3,752,877 A | * | 8/1973 | Beavon ..................... | 423/244.1 |
| 5,494,650 A | * | 2/1996 | Kvasnikoff et al. .......... | 423/220 |
| 5,512,260 A | * | 4/1996 | Kiliany et al. ............. | 423/242.1 |
| 5,676,921 A | * | 10/1997 | Heisel et al. ............... | 423/573.1 |
| 6,444,185 B1 | * | 9/2002 | Nougayrede et al. ...... | 423/242.1 |
| 7,846,325 B2 | * | 12/2010 | Van Hardeveld et al. ..... | 208/247 |

* cited by examiner

*Primary Examiner* — Timothy Vanoy
(74) *Attorney, Agent, or Firm* — D. Doak Horne (57) ABSTRACT

A method of reducing sulfur compounds from an incoming gas stream, comprising flowing the gas stream over a hydrolysis catalyst to convert COS and $CS_2$ to $H_2S$ and reduce $SO_2$ to elemental sulfur to form an effluent stream; providing an acidic gas removal unit comprising an absorbent; flowing said effluent stream over said absorbent to produce a stream free of acidic gases; applying an acidic-gas desorption mode to said acidic-gas rich absorbent to produce an acidic gas stream; introducing oxygen to said acidic gas-rich stream; providing a direct oxidation vessel containing catalyst suitable for catalyzing the oxidation of the $H_2S$ to sulfur wherein the temperature of the vessel is at or above the sulfur dew point at the reaction pressure; and flowing said acidic gas-rich stream over said catalyst to produce a processed stream having a reduced level of sulfur compounds.

30 Claims, 5 Drawing Sheets

PROCESS FOR THE REMOVAL OF SULFUR COMPOUNDS FROM GAS STREAMS

PRIORITY

This application claims priority from Canadian Patent Applications 2,768,359 and 2,769,060 each filed Feb. 17, 2012.

FIELD OF THE INVENTION

The invention generally relates to a chemical processes used in processing recovered gas and oil, and more particularly to a process and apparatus for the removal of sulfur compounds from gas streams.

BACKGROUND

Natural gas and refinery gas streams are commonly contaminated with sulfur-containing compounds such as hydrogen sulfide ($H_2S$) and/or carbonyl sulfide (COS) and carbon dioxide ($CO_2$). If substantial amounts of $H_2S$ are present, regulatory restrictions dictate special precautions must be taken to purify the gas streams. The first step of the $H_2S$ removal process from the $H_2S$-containing streams is accomplished by an acid-gas removal unit which removes substantial amounts of $H_2S$ and $CO_2$ from the acidic-gas containing streams. The off-gas from the acid-gas removal unit is mainly $H_2S$ and $CO_2$. The sulfur from this off-gas stream is usually removed by the Claus reaction which produces salable elemental sulfur. After a 'tail-gas' treatment to further reduce the sulphur content, the remaining $CO_2$ may be safely vented to the atmosphere. However, there has been increasing concern about the damage caused by $CO_2$ and this has led to an increased demand to reduce the emission of $CO_2$ to the atmosphere.

Typically, separation of $CO_2$ and $H_2S$ from streams containing acidic gas is achieved by the chemical absorption process employing liquid amine solutions, such as monoethanolamine (MEA), diethanolamine (DEA) or methyldiethanolamine (MDEA). In this process the $CO_2$ reacts with the liquid amine solution to form a carbamate, while $H_2S$ reacts with the amine solution to form (amine)$H^+$ and bisulfide ($SH^-$) species. Upon heating, the carbamate and (amine)$H^+$ species decompose to release the absorbed $CO_2$ and $H_2S$ and produce a regenerated amine solution. Disadvantageously with this process, however, sulfur-containing compounds such as $SO_2$, COS and/or $CS_2$, if present in the feed stream, react with the liquid amine absorbent and a higher temperature is required to regenerate the amine solution. $SO_2$ also reacts with the amine to form sulphates which necessitates partial replacement of the amine.

Liquid alkoxylated amines, such as diisopropanolamine, have been used for $CO_2$ removal from streams containing acidic gases. U.S. Pat. No. 4,044,100 described the use of liquid mixtures of diisopropanolamine and polyethylene glycol for acid gas removal from gaseous streams.

There are many fields of applications in which it is required to remove $H_2S$ and $CO_2$ from streams containing acidic gases. U.S. Pat. No. 4,553,984 describes a process for the removal of $CO_2$ and $H_2S$, simultaneously, from streams containing acidic gases wherein the stream is brought into counter flow contact with an aqueous of methyldiethanolamine (MDEA) at a pressure of 10-110 bars. Nevertheless, there are different applications in which it is required to reduce the $H_2S$ to a very low level without essential removal of $CO_2$; therefore, solvents with high $H_2S$-absorbing power are desired. U.S. Pat. No. 5,277,884 disclosed a process for selective removal of $H_2S$ from streams containing both $H_2S$ and $CO_2$ acidic gases. The process according to that invention comprises contacting the acidic gas containing stream with a solvent that comprises a mixture of N-methylpyrrolidone (NMP) and dodecane.

The acid gas removal process utilizing liquid amine solutions is costly and energy-intensive because the liquid amine solution has a limited life time due to its degradation through oxidation. Furthermore, the high corrosivity of the utilized amine makes it prohibitive to use high concentrations of the amine solutions. Therefore, new acidic gas capture technology utilizing thermally stable solid sorbents has increasingly received attention due to its potential for reducing corrosion and energy cost and improving mass/heat transfer efficiency. Such technology is based on the ability of a porous solid sorbent to reversibly adsorb the $CO_2$ and $H_2S$ from the acidic gas containing streams at high pressure.

U.S. patent application Ser. No. 13/399,911 filed Feb. 17, 2012 relates to a process for a acidic gas recovery from acidic gas containing streams employing a class of novel thermally stable amine adducts (sorbents). The regenerable sorbents described in that process had high $CO_2$ and $H_2S$ absorption capacity and comprised a porous solid support, a cross-linked amine and a polyol reactive toward the utilized amine. The sorbents according to this invention enable acidic gas absorption/desorption cycles at various temperatures and pressures. Advantageously, the absorption/desorption cycles could be conducted at a pressure of 1500 psig and a temperature of 130° C., so that the $CO_2$ at this condition was ready for direct downhole storage or pipelining at greatly reduced compression costs. In addition the adsorption could take place at low pressure with desorption at high pressure.

Typically, the desorbed gas stream from an acid-gas removal unit is mainly $H_2S$ and $CO_2$ and the sulfur is usually removed by the Claus process. In the first step in the Claus process, one third of the hydrogen sulfide present in the feed stream is oxidized to sulfur dioxide, $SO_2$, by the reaction as follows:

$$H_2S + O_2 = SO_2 + H_2$$

In the second step, the remaining $H_2S$ and the $SO_2$ are reacted in the presence of a Claus catalyst to form elemental sulfur in a Claus reactor according to Reaction 1:

$$2H_2S + SO_2 = 2H_2O + 3S \quad \text{Claus reaction} \qquad 1.$$

The Claus reaction is limited by thermodynamic equilibrium and only a portion of the total sulfur can be produced. Therefore, multiple stages with sulfur condensation between the stages are needed in order to increase the sulfur recovery factor. The effluent gas from a series of reactors in a Claus plant contains varying amounts of different compounds including sulfur vapor, sulfur dioxide, un-reacted $H_2S$, carbonyl sulfide (COS), and/or carbon disulfide ($CS_2$). Carbon disulphide is formed according to Reaction 2:

$$CH_4 + 4S \rightarrow CS_2 + 2H_2S \quad \text{High temperature Claus furnace or combustion reaction} \qquad 2.$$

Removal of the sulfur content of the off-gas streams from the Claus process is accomplished by catalytic reduction with hydrogen to convert the sulfur compounds to $H_2S$, absorption of the $H_2S$ produced with an additional amine system and then recycling the desorbed gas to the Claus plant. This process is operable as long as the concentration of the $CO_2$ is up to 15% and $H_2S$ is above 50% by volume in the feed stream. However, if the $H_2S/CO_2$ feed gas stream to Claus process contains less than 40% by volume $H_2S$, the Claus plant becomes difficult to operate with respect to the thermal zone and special considerations have to be taken when combusting part of $H_2S$ to $SO_2$ as required for the Claus reaction. These operational difficulties mainly arise from the fact that the required temperatures for the combustion of $H_2S$ cannot be reached in the thermal zone. Therefore, the off-gas stream from the Claus plant is burned with air to convert all sulfur-containing compounds in the stream to $SO_2$ before discharge into the atmosphere. As the environmental requirements are becoming stricter, the $SO_2$ emission limit is being lowered, giving rise to the challenge of how to reduce or completely eliminate $SO_2$ emissions. Consequently, another sulfur removal process is needed that can handle $H_2S/CO_2$ feed gas streams containing $CO_2$ of concentrations greater than 15% and $H_2S$ of a concentration less than 40% by volume.

The direct oxidation of $H_2S$ to elemental sulfur using oxidation catalysts has gained broad acceptance for achieving high sulfur removal efficiency. U.S. Pat. No. 4,197,277 describes a process for the oxidation of $H_2S$ to elemental sulfur by the following $H_2S$ Oxidation Reactions 3 and 4:

$$H_2S + 0.5O_2 \rightarrow S + H_2O \quad H_2S \text{ Partial oxidation} \qquad 3.$$

$$H_2S + 1.5O_2 \rightarrow SO_2 + H_2O \quad H_2S \text{ Complete oxidation} \qquad 4.$$

According to U.S. Pat. No. 4,197,277, the $H_2S$-containing gas is passed with an oxygen-containing gas over a catalyst which comprises iron oxide and vanadium oxide as active materials and aluminum oxide as a support material. The catalyst described in that Patent gives rise to at least a partial Claus equilibrium, so that $SO_2$ formation cannot be prevented. Similarly, U.S. Pat. No. 5,352,422 describes a process for oxidizing the un-reacted $H_2S$ in the Claus tail gas to elemental sulfur. The patent describes a catalyst prepared by impregnation of an iron containing solution or an iron/chromium-containing solution into several carriers followed by calcinations in air at 500° C.

U.S. Pat. No. 4,818,740 disclosed a catalyst for the $H_2S$ oxidation to elemental sulfur, the use of which prevents the reverse Claus reaction to a large extent. The catalyst according to that patent comprises a support of which the surface exposed to the gaseous phase does not exhibit any alkaline properties under the reaction conditions, while a catalytically active material is applied to this surface. An improvement of the method disclosed in '740 is disclosed in European Patent 409,353. This patent relates to a catalyst for the selective oxidation of sulfur-containing compounds to elemental sulfur, comprising at least one catalytically active material and optionally a support. The described catalyst exhibits substantially no activity towards the reverse Claus reaction under the reaction conditions.

The $H_2S$ direct oxidation to elemental sulfur is suitable for gas streams comprising high concentrations of $CO_2$ and low concentrations of $H_2S$. Nevertheless, the total sulfur removal efficiency decreases if carbon monoxide or COS gases are present in the feed stream. Carbon monoxide, if present in the feed gas streams, undergoes side reactions during the $H_2S$ direct oxidation to form COS. In addition, $CO_2$ may also react with $H_2S$ to form COS during direct oxidation reaction:

$$CO + S \rightarrow COS \qquad 5.$$

$$CO + H_2S \rightarrow COS + H_2 \qquad 6.$$

$$3CO + SO_2 \rightarrow COS + 2CO_2 \qquad 7.$$

$$H_2S + CO_2 \rightarrow COS + H_2O \qquad 8.$$

U.S. patent application Ser. No. 13/399,710 filed Feb. 17, 2012 entitled "Removal of Sulfur Compounds from a Gas Stream" relates to a process for simultaneously oxidizing $H_2S$ to elemental sulfur and hydrolyzing COS to $H_2S$ in the presence of an oxidation catalyst and a feed gas stream containing CO of a concentration greater than 1% by volume and $CO_2$ of a concentration greater than 14% by volume of the total feed gas flow. In this process, an $H_2S$-containing stream was mixed with a molecular oxygen containing gas and then passed over an oxidation catalyst at a temperature of 220° C., a gas hourly space velocity of 1000 $hr^{-1}$ and a pressure of 100 psig. The concentration of the COS produced decreased from 1900 ppm, using a dry gas stream, to 316 ppm upon using a feed stream containing greater than 10% water. The oxygen in the feed gas stream was adjusted to achieve the highest conversion of $H_2S$ to elemental sulfur and to deliberately produce an off-gas stream containing $H_2S/SO_2$ ratio of 2:1 which is ready as a feed gas stream for other sulfur removal units such as Crystasulf™[1]. Therefore, the process was operated at a relatively low sulfur yield of 78.1% and a total $H_2S$ conversion of 90.4%.

[1] Trademark of URS CORPORATION for sulfur removal units.

In summary, high sulfur removal efficiency can be achieved by utilizing a multi-stage Claus process and off-gas post treatment. Importantly, however, this process is limited by the concentration of the $CO_2$ in the gas stream and necessity of employing an $H_2S$ enrichment unit. Therefore, other sulfur recovery processes, such as the $H_2S$ direct oxidation process, have gained worldwide attention. In fact, the $H_2S$ direct oxidation to elemental sulfur process has become the cornerstone of the high sulfur recovery upon coupling with Claus process. Disadvantageously, however, the $H_2S$ direct oxidation process is still limited due to the process conditions and feed gas composition. As mentioned, a considerable amount of COS is produced when operating the $H_2S$ direct oxidation process, in a once-through mode, with sulfur-containing gas streams comprising CO and $CO_2$ at a temperature above the sulfur dew point and a high pressure. Consequently, a robust sulfur removal process that can overcome the aforementioned difficulties is still needed.

SUMMARY OF THE INVENTION

The present invention provides a robust process for the efficient carbon dioxide recovery and desulfurization of feed stream gases comprising sulfur constituents as well as a considerable amount of carbon dioxide at elevated pressure, including but not limited to $CO_2$ of a concentration greater than 14% by volume of the total feed gas flow.

The process according to this invention not only converts the sulfur-containing compounds to elemental sulfur but also produces a high pressure $CO_2$ stream of high purity. This process will remarkably reduce the size of the reactor required for the desulfurization of the feed streams and will also provide a significant energy consumption advantage when the $CO_2$ gas stream is compressed for pipelining or deep well disposal. The feed streams suitable for the process according to the present invention comprise but are limited to sulfur containing compounds, such as $H_2S$, $SO_2$, COS, $CS_2$; oxidizable constituents such as, hydrogen, carbon monoxide, light hydrocarbons, e.g. methane, ethane or propane; natural gas; associated gas from oil production; gases produced from oilsand refining, e.g. coker gas; gases produced from Toe-to-Heel-Air-Injection process (THAI™); or other in situ combustion gas; coal or oil gasification processes; inert gases, such as nitrogen, helium or carbon dioxide and any combination thereof.

The approach utilized in the present invention is to selectively remove and concentrate the $H_2S$ and/or $CO_2$ from the gas streams, and then oxidize the $H_2S$ to salable elemental sulfur. More particular, this invention comprises a process for the removal of $H_2S$ and/or $CO_2$ from the sour gases at room temperature and elevated pressure by contacting the sour gas with a suitable acid gas absorbent. Then, subjecting the absorbent to a desorption mode at a pressure similar to the absorption pressure but at an elevated temperature. The produced gas stream from the desorption mode contains mainly $H_2S$, $CO_2$ and/or $N_2$. Subsequently, the product gas from the desorption mode is mixed with a stream containing molecular oxygen and is then passed to an $H_2S$ direct oxidation reactor to partially oxidize the $H_2S$ to elemental sulfur.

Accordingly, in one broad aspect of the method of the present invention, such method comprises a method of reducing the amount of sulfur compounds in an incoming gas stream comprising:

a. providing a guard bed containing an hydrolysis catalyst for the conversion of COS and $CS_2$ to $H_2S$ and the reduction of $SO_2$ to elemental sulfur, and optionally also an RSH adsorbent suitable for RSH removal;

b. flowing said incoming gas stream through said guard bed to produce an effluent stream;

c. providing an acidic gas removal unit comprising an absorbent suitable for acidic gas absorption;

d. flowing said effluent stream from the guard bed over said absorbent in the acidic gas removal unit to produce a stream that is free of acidic gases, said absorbent becoming rich in acidic gases, e. applying an acidic-gas desorption condition to said acidic-gas rich absorbent to desorb acid gases from said absorbent and produce an acidic gas stream rich in acidic gases;

f. introducing oxygen to said acidic gas-rich stream;

g. providing a direct oxidation vessel containing a catalytic reaction zone comprising a catalyst suitable for catalyzing the oxidation of the $H_2S$ to sulfur wherein the temperature of the reaction zone is at or above the sulfur dew point at the reaction pressure;

h. flowing said acidic gas-rich stream over said catalyst to produce a processed stream comprises a reduced level of said sulfur compounds when compared to the incoming effluent; and i. recycling at least a portion of said processed stream of reduced sulfur compounds back for passage through to said guard bed and acidic gas removal unit.

In a preferred embodiment, such process produces a pressurized stream of high $CO_2$ purity.

In a further embodiment, water is added to said incoming gas stream prior to delivery of said incoming gas stream to said guard bed.

In a further preferred embodiment, the sulfur compounds comprise one or more of COS, $CS_2$, $SO_2$, RSH and $H_2S$.

In a further preferred embodiment, the RSH adsorbent comprises activated carbon.

In a further preferred embodiment, the hydrolysis catalysis includes one or more of alumina, titania or zirconia.

In a preferred embodiment of the above method, the guard bed is maintained in the range of from 20° C. to 300° C.

In a preferred embodiment of the above method, according to claim 1 wherein said absorbent suitable for acidic-gas removal includes physical or chemical solvents.

In a preferred embodiment of the above method, the physical or chemical solvents used as absorbents are in liquid form or supported on porous support.

In a still-further embodiment of the above method, the acidic-gas absorption or adsorption mode is conducted at a temperature below 100° C.

In a still further embodiment of the above method, the acidic-gas absorption or adsorption mode is conducted at a pressure of up to 1500 psig.

In a still-further preferred embodiment of the above method, the method comprises a desorption step wherein acidic gas is desorbed from the acidic gas absorbent.

In a still further preferred embodiment, the desorption step is conducted at a temperature at least 20° C. above the absorption or adsorption temperature.

In a still further preferred embodiment, the desorption step is conducted at a pressure up to 1500 psig.

In a still further preferred embodiment, the temperature of the reaction zone in the direct-oxidation vessel is in the range of 150° C. to 400° C.

In a still further preferred embodiment, the incoming gas stream to the direct oxidation vessel is at a gas hourly space velocity between 100 to 10,000 $hr^{-1}$.

In a still further preferred embodiment, the pressure in the reaction zone in the direct oxidation vessel is between 15 and 500 psig.

In another aspect of the present invention, the present invention relates to a system for reducing the amount of sulfur compounds in an incoming gas stream and producing a $CO_2$ stream of high purity. Accordingly, such system of the present invention, in a broad aspect thereof, comprises:

i. a guard bed containing an hydrolysis catalyst, said hydrolysis catalyst adapted for the conversion of COS and $CS_2$ to $H_2S$ and the reduction of $SO_2$ to elemental sulfur, and optionally also an RSH adsorbent suitable for RSH removal, said guard bed adapted to receive said incoming stream and produce an effluent stream after passage of said incoming stream through said guard bed;

ii. an acidic gas removal unit comprising an absorbent suitable for acidic gas absorption, adapted to receive said effluent stream and produce a produced stream that is free of acidic gases, said absorbent becoming rich in acidic gases;

iii. said absorbent adapted, when said having heat applied thereto, to produce an acidic gas stream rich in acidic gases;

iv. oxygen supply means, adapted to supply oxygen to said acidic gas stream;

v. a direct oxidation vessel, adapted to receive said acidic stream rich in acidic gases and oxygen, and containing a catalytic reaction zone comprising a catalyst suitable for catalyzing the oxidation of the $H_2S$ to sulfur wherein the temperature of the reaction zone is at or above the sulfur dew point at the reaction pressure, and to produce a processed stream comprising a reduced level of said sulfur compounds when compared to the incoming acidic stream; and vi. recycling piping to recycle at least a portion of said processed stream back to said guard bed and acidic gas removal unit.

In a preferred embodiment of the above system the sulfur compounds comprise one or more of COS, $CS_2$, $SO_2$, RSH and $H_2S$.

In a further preferred embodiment of the system where an RSH adsorbent is used, such RSH adsorbent comprises activated carbon.

In a further preferred embodiment the hydrolysis catalysis includes one or more of alumina, titania or zirconia.

In a still further preferred embodiment, the absorbent suitable for acidic gas absorption comprises physical or chemical solvents for acidic-gas removal, and further wherein said physical or chemical solvents are in liquid form or supported on a porous support.

DETAILED DESCRIPTION OF THE INVENTION

Figure 1:
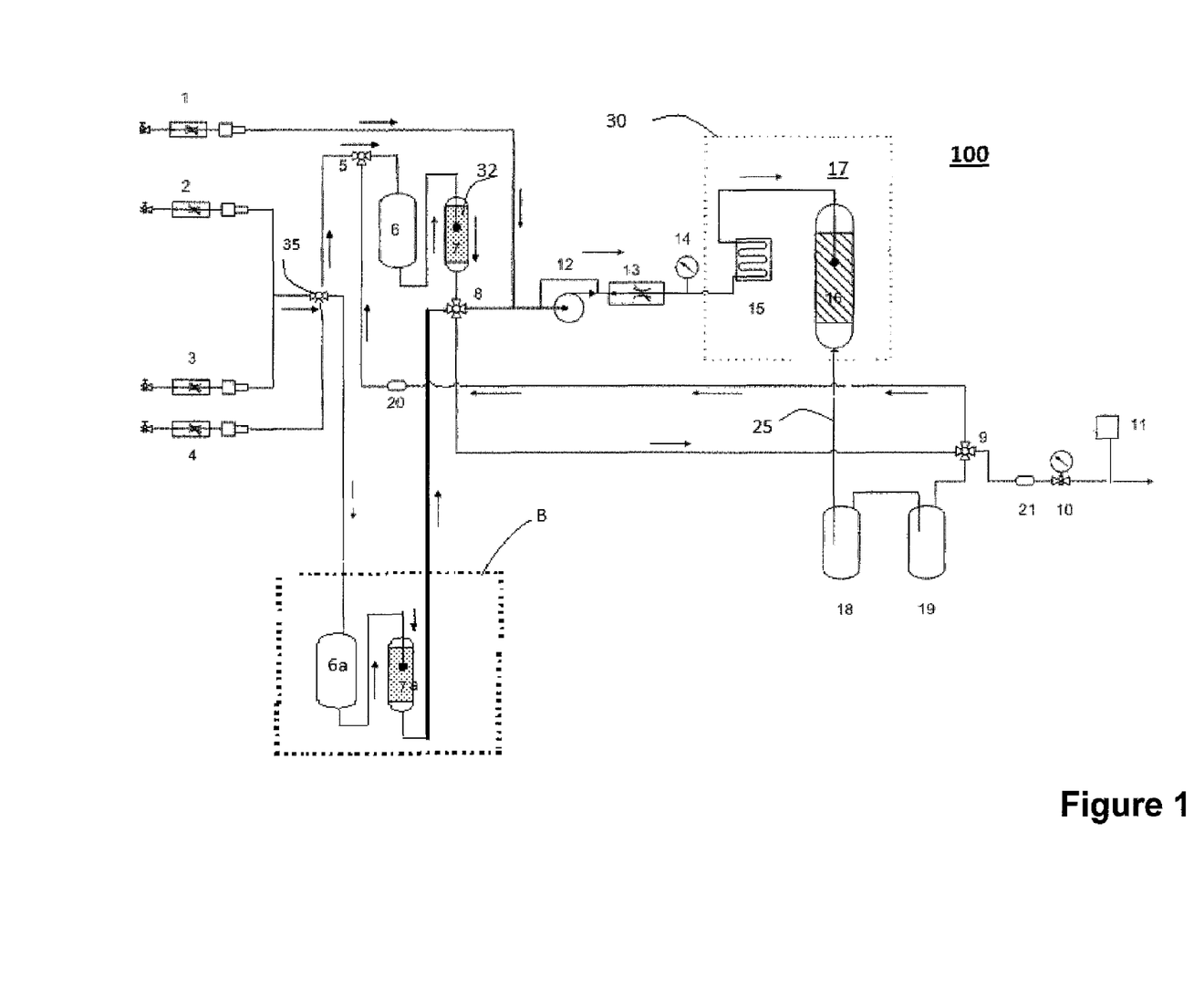
FIG. 1 is a schematic diagram of the desulfurization process of the present invention.

Referring to FIG. 1, the overall chemical process of the present invention is shown as a flow diagram in which the components of the acid gas removal system apparatus 100 are shown.

According to the first step of the process, a sulfur-containing gas stream 2, 3, typically a sour gas stream comprising $CO_2$ and $H_2S$, is fed to a primary absorber column 7 comprising an amine-based acid gas absorbent to remove the $CO_2$ and $H_2S$ from the sour gas stream.

Notably, however, different sulfur containing compounds such as COS, $SO_2$ and/or RSH, if present in the sour gas stream, will react with the amine-based absorbent, and reduce its $CO_2$ and $H_2S$ absorption capacity. Therefore, a protective guard bed 6 containing alumina and/or activated carbon at a temperature of 120° C. is placed on the feed gas stream prior to the primary amine absorber column 7 [and also prior to the secondary amine absorber column 7a—see below]. The main function of the protective guard bed 6, 6a is to remove the RSH from the sour gas stream 2,3 and to catalyze the reaction of the $H_2S$ with $SO_2$, if present, to produce elemental sulfur which can eventually be recovered by regenerating the guard bed 6, 6a at a temperature of 220° C. in a flow of a $N_2$ sweep gas 4. Moreover, the alumina guard bed 6, 6a will catalyze the hydrolysis of the COS and/or $CS_2$ to $H_2S$ and $CO_2$ prior to the respective primary (or secondary) amine-based absorber 7, 7a.

In a commercial application, a single stream containing acid gases will normally be treated. But in the laboratory demonstration unit of FIG. 1, for ease of operation, two streams, 2 and 3 comprise the feed gas stream. Stream 2 is a mixture of nitrogen and hydrogen sulfide and stream 3 is a mixture of the other components: $CO_2$, $H_2$, CO, $CH_4$ and $N_2$. Streams 2 and 3 are mixed to produce a synthetic sour gas mixture containing $CO_2$, $H_2S$, $H_2$, CO, $CH_4$ and $N_2$. The flow rates of the inlet gas streams 2 and 3 are controlled via mass flow controllers and the pressure of the guard bed 6, 6a and absorber column 7, 7a is regulated by a back pressure control valve 10. The pressure of the inlet feed stream 2, 3 is about 130 psig and temperature is about 20° C. The synthetic sour gas stream 2,3 is initially passed through valve 5 to a guard bed 6 comprising alumina and/or activated carbon at 120° C. Under these conditions, the COS and/or $CS_2$ is hydrolyzed to $H_2S$ and $CO_2$, while $SO_2$, if present, is converted to elemental sulfur by the reaction with the $H_2S$ present in the feed gas stream. Subsequently, the effluent gas from the protective guard bed 6 is cooled down and then fed to a primary absorber column 7 containing an amine-based absorbent 32 to selectively remove the $H_2S$ and/or $CO_2$ from the sour gas stream. The $H_2S$ and $CO_2$ are absorbed immediately, and a purified produced gas containing $H_2$, CO, $CH_4$ and $N_2$ leaves the absorption bed 7 through valve 8. During the absorption mode, valves 8 and 9 are employed to direct the de-sulfurized gas from the absorber column 7 to a micro gas chromatograph 11 equipped with an automated stream selection means (not shown) to determine the moment of breakthrough of the acidic gas, and when detected, to adjust valve 8 to direct flow from absorber column to pump 12 during the desorption phase (see below).

The acidic gas absorption mode is performed at room temperature and a pressure of 100 psig, while the desorption mode is conducted at a temperature of 130° C. using a sweep gas such as $N_2$ or $CO_2$.

Upon the acidic gas breakthrough (ie upon saturation of the amine-based absorbent 32 in primary absorbent column 7 and when detected by gas chromatograph 11 or other similar device-), the sour feed gas stream 2,3 is switched via valve 35 to secondary guard bed/absorber column system B, and valve 8 redirects the produced gas stream from secondary system B to gas analyzer 11. Secondary system B has a secondary protective guard bed 6a, and secondary amine absorber column 7a. At such time the primary absorber column 7 is converted to a desorption mode. Specifically, the loaded or rich absorbent 32, i.e. absorbent containing the absorbed $H_2S$ and $CO_2$ within amine absorber column 7 is heated to 130° C. to free the $H_2S$ and $CO_2$ from the absorbent. Therefore, the pressure of the absorber column 7 increases from 100 psig (at room temperature) to 150 psig. At this point, the rich gas stream leaving the absorber 7 is composed of $H_2S$, $CO_2$ and $N_2$ (sweep gas). If $CO_2$ is used as a sweep gas, the resultant gas stream cannot be processed in Claus plant because the ratio of the $H_2S$ to $CO_2$ would be too low. Conversely, this stream is suitable for the $H_2S$ direct oxidation to elemental sulfur process. The process according to this invention, therefore, provides a subsequent batch process for the partial oxidation of the $H_2S$ present in this stream to elemental sulfur. The sulfur removal efficiency of the batch process according to this invention is greater than 99% by volume.

In the second step of the process, and with continued reference to FIG. 1, the $H_2S$-rich gas from the absorber column 7 is sent to an $H_2S$ direct oxidation system 30 to partially oxidize the $H_2S$ to elemental sulfur. Accordingly, the $CO_2$/$H_2S$ desorbed gas stream at a pressure of 150 psig is passed through valve 8 and then mixed with a molecular oxygen containing stream 1 to produce a gas mixture containing mainly $CO_2$, $H_2S$, $O_2$ and/or $N_2$. Typically, small amounts of COS and $SO_2$ byproducts are produced during the $H_2S$ direct oxidation reaction. Therefore, the flow rate of the molecular oxygen-containing stream is adjusted such that the molecular oxygen to $H_2S$ ratio is less than 0.5. The resultant gas mixture at a pressure of about 150 psig is then sent to a gas circulating pump 12 to supply the gas mixture to the $H_2S$ direct oxidation system 30 having a $H_2S$ oxidation reactor 16. The feed gas flow rate for the $H_2S$ direct oxidation reactor 16 is controlled via a mass flow controller 13, and its pressure is monitored by a pressure gauge 14. The feed gas stream of the $H_2S$ oxidation reactor 16 which forms part of $H_2S$ direct oxidation system 30 is firstly passed through a pre-heating coil 15 to bring the feed gas mixture to the desired temperature. $H_2S$ oxidation reactor 16 in the form of a down flow reactor is utilized for the oxidation of $H_2S$ to elemental sulfur. The down flow reactor 16 is packed with an oxidation catalyst, and located in an oven 17 and operated at a temperature slightly greater than the sulfur dew point at the oxidation reaction pressure. Initially, the pressure of the $H_2S$ direct oxidation reactor 16 is adjusted to 60 psig via the back pressure control valve 10 and then increased to a pressure of 100 psig upon mixing with the gas mixture during the oxidation process. As a result, the overall pressure of the $H_2S$ direct oxidation system 30 is about a 100 psig.

The product effluent 25 from the $H_2S$ direct oxidation reactor 16 comprises un-reacted $H_2S$, $H_2$, CO, CO2, $CH_4$, $N_2$, sulfur vapor and a very small amount of COS and/or $SO_2$. Consequently, the produced fluid from the oxidation reactor 16 is cooled to separate the produced sulfur from the gas phase in sequential initial and secondary separators 18, 19 respectively, and the effluent gas from the secondary sulfur separator 19 is then recycled back to the $H_2S$ direct oxidation system 30 to increase the overall sulfur recovery factor. The product gas from secondary separator 19 is passed through valve 9, micro filter 20, valve 5 and then to the guard bed 6. The temperature of the protective guard bed 6, 6a and amine-based absorber 7, 7a are maintained fairly constant during the effluent gas recycling process at temperatures of 120° C. and 130° C., respectively. As indicated earlier, the produced COS is hydrolyzed in the guard bed 6, 6a to $H_2S$, and the produced $SO_2$ is removed by the reaction with the $H_2S$ present in the stream producing elemental sulfur. The effluent gas recycling procedure according to the second step of this process is repeated until the $H_2S$ in the recycle gas is less than 50 ppmv and the overall $H_2S$ conversion to elemental sulfur is greater than 99%.

According to the third step of the process, the primary absorber column 7 at a temperature of 130° C. and a pressure of 100 psig is purged with a gas free of $CO_2$ and $H_2S$ to avoid the re-adsorption of $CO_2$ and $H_2S$ upon cooling down the absorber to room temperature. A $N_2$ gas stream or a fraction of the off-gas stream from the secondary guard bed 6a and absorber column 7a ($CO_2$ and $H_2S$ free gas) is employed until no $CO_2$ is detected in the outlet gas stream. Subsequently, the primary absorber column 7 is cooled to room temperature, and valve 35 is then adjusted to prevent incoming stream flow to secondary system B, and simultaneously allowing incoming stream to flow to then be re-directed back to guard bed 6 and absorber column 7 then being used in a new $CO_2/H_2S$ absorption cycle, with absorber column 7a in secondary amine absorber system B then undergoing the desorption process earlier conducted on absorbent column 7. When using $CO_2$ as the sweep gas and pure $O_2$ as the oxygen source, the off gas will be 99.9% pure. Meanwhile, the pressure of the oxidation reactor 16, if not being supplied with desorbed gas from secondary system B, is reduced to 60 psig.

In one particular first preferred embodiment and with continued reference to FIG. 1, the acidic gas containing stream at a pressure up to 1500 psig is passed through a humidifier (not shown) at a temperature in the range from 30° C. to 90° C. and then through a protective guard bed 6 comprising an RSH absorbent and/or a catalyst 32 at a temperature in the range from 30° C. to a temperature slightly greater than the sulfur dew point at the process pressure. The RSH absorbent 32 includes but is not limited to activated carbon and silica gel impregnated with Cu(II) and Mn(IV). The catalyst component thereof comprises but is not limited to alumina, titania and supported metal oxide catalyst. The use of the guard bed 6, 6a is advantageous in the case of feed gas streams comprising CO, CO2, RSH, COS and $SO_2$. The metal oxide/s catalyst included in the guard bed 6, 6a hydrolyzes the COS and $CS_2$ to $H_2S$ and $CO_2$ and reduces the $SO_2$, if present in the feed stream or produced as a byproduct during the $H_2S$ direct oxidation, to elemental sulfur. Therefore, $H_2S$ is the only sulfur constituent in the off-gas stream from the guard bed 6, 6a. The off-gas stream from the guard bed 6, 6a is then passed through valve 8 and directed to initial and secondary separators 18, 19 and therein cooled down. The $H_2S$ and $CO_2$ are simultaneously removed from the off-gas stream by a primary acidic gas removal unit 7, 7a. The acidic gas removal units 7, 7a may contain any of the available technologies based on the liquid or solid absorbents which are selective toward both $H_2S$ and $CO_2$ gases. Once the acidic gases have broken through in either acidic gas removal unit 7, as detected by the gas analyzer 11, the feed gas stream is switched to a secondary guard bed/acidic gas removal unit B, and the primary acidic removal unit 7 is conducted to a desorption process at a temperature higher than the absorption temperature. Carbon monoxide, if present in the feed gas, tends to react with the $H_2S$ to form COS (equation 6) in the amine based acidic gas removal units. Typically, the COS produced in the acid removal units 7, 7a reacts with the amine based sorbents and a higher energy is required to regenerate the amine based sorbents. Moreover, a considerable amount of COS will be produced during the oxidation of H2S to elemental sulfur which in turn will reduce the sulfur selectivity per each cycle. Although the produced COS will be hydrolyzed to $H_2S$ in the guard bed, the overall sulfur removal process will be too long (Example 2). Therefore, once the acidic gases have broken through, the off-gas stream from the primary acidic gas removal unit 7 is mixed with a molecular oxygen containing stream 1 and the resultant mixture is then sent to an $H_2S$ direct oxidation reactor 16 comprising a suitable oxidation catalyst at a temperature slightly greater than the sulfur dew point at the reaction pressure. The present invention employs any catalyst suitable for the oxidation of $H_2S$ to elemental sulfur. Typically, the oxidation catalyst comprises an oxide and/or sulfide form of one or more metals deposited or mixed with one or more refractory metal oxides. The metal oxides and/or sulfides include, but are not limited to oxides and/or sulfides of V, Cr, Mn, Fe, Co, Ni, Cu, Nb, Mo, Tc, Ru, Rh, Pd, Hf, Ta, W, Re, Os, Ir, Pt, Au, La, Ce, Pr, Nd, Pm, Sm, Eu, Gd, Tb, Dy, Ho, Er, Tm, Yb, Lu, Bi or any combinations thereof. The refractory metal oxides include, but are not limited to Al, Ti, Si, Zr and any combinations thereof.

According to one embodiment of the present invention, the high desulfurization level of the resultant mixture is achieved by utilizing a batch process, which is accomplished by recycling the effluent gas from the $H_2S$ direct oxidation unit 16 to the primary guard bed 6 at a temperature in the range of from 30° C. to a temperature slightly greater than the sulfur dew point, carrying out acidic gas removal at a temperature greater than the acidic gas absorption temperature and then directing such stream flow to the $H_2S$ direct oxidation unit 16. Interstage cooling between recycling is accomplished via initial and secondary separators 18, 19 which are provided to remove the produced sulfur from the recycle stream. The effluent gas recycling process is repeated until the $H_2S$ concentration in the recycle gas is about 10 ppmv. Before cooling down to room temperature, the primary acidic gas removal unit 7 is purged with an $H_2S$ and $CO_2$ free gas such as $N_2$ (stream 4, by adjusting valve 35 to permit flow thereof) and the off gas stream from the purging process is mixed with the feed gas stream of the secondary guard bed/acidic gas removal unit B. Meanwhile, the pressure of the direct oxidation reactor 16 is reduced to 60 prig, producing a $CO_2$ stream of purity greater than 99.9% by volume.

In a second embodiment, the acidic gas removal unit 7, 7a according to the present process comprises amine based sorbents suitable for the removal of the acidic gases from acidic gases containing streams and for the hydrolysis of COS to $H_2S$ and $CO_2$ at low temperatures. These amines include but are not limited to 1,4-Diazabicyclo[2,2,2]-Octane, 1,5-Diazabicyclo[5,4,0]-Undec-5-ene, 1,4-dimethylpiperazin-2-one and 1,5-Diazabicyclo[4,3,0]-non-5-ene. These amines can be in the liquid form or supported on any type of the porous solid support systems known in the art. The use of these amines is advantageous in the case of using feed streams of high CO content because it eliminates the necessity of the purging step required for the removal the CO from the acidic gas removal units.

In a third embodiment, one or both of the acidic gas removal units 7, 7a according to the present process comprise amine based sorbents of high selectivity toward $H_2S$. The amines suitable for manufacturing the sorbents according to the present process include but are not limited to one or more of N-methylpyrrolidone (NMP)/dodecane, 1,4-Diazabicyclo[2,2,2]-Octane and diisopropanolamine. These amines can be in the liquid form or supported on any type of the porous solid support systems known in the art. The benefits of utilizing the high $H_2S$ selective amine sorbents is that it can handle a large volume of the acidic gas containing streams and increase the concentration of the $H_2S$ in the off-gas stream from the acidic gas removal unit 7, 7a.

In a fourth embodiment according to the present invention, an $H_2S$ and/or $CO_2$ containing stream is supplied to a primary acidic gas removal unit 7 without pretreatment. The acidic gas removal unit comprises amine based sorbents suitable for the COS hydrolysis to $H_2S$ and of high $H_2S$ absorption selectivity. Once the acidic gases have broken through, the primary acidic gas removal unit 7 is purged at room temperature with $N_2$ gas to remove the residual CO gas, if present in the feed gas stream, and is then conducted to a desorption mode at a temperature higher than the absorption temperature. The effluent stream from the primary acidic gas removal unit 7 is mixed with a continuous flow of a molecular oxygen containing stream 1 and the oxygen to $H_2S$ ratio in the resultant gas mixture is deliberately adjusted to a ratio less than 0.5 to avoid the oxidation of the $H_2S$ to $SO_2$. The resultant gas mixture is then supplied to an $H_2S$ direct oxidation system 30 having an $H_2S$ direct oxidation reactor 16 containing any $H_2S$ oxidation catalyst known in the art to partially oxidize the $H_2S$ in the gas mixture to elemental sulfur. Similarly, the high desulfurization level of the gas mixture can be achieved in a batch process by recycling the off-gas stream from the $H_2S$ direct oxidation reactor 16 to the acidic gas removal unit 7, 7a at a temperature greater than the acidic gas absorption temperature.

Example 1

This example illustrates the first embodiment. In this example, the acidic gas removal unit 7 comprises a porous solid-supported amine sorbent to remove the acidic gases from the feed stream. The supported amine sorbent utilized in this example has a high absorption capacity for $H_2S$ ad $CO_2$.

Synthesis of the Sorbent

The supported amine sorbent was synthesized similarly to reported procedure (see, U.S. patent Ser. No. 13/399,911 filed Feb. 17, 2012). The absorbent was manufactured in small fractions which were combined. The surface physical characteristics of the support utilized are shown in Table 1.

TABLE 1

Physical characteristics of the absorber supports

| Absorber support | Examples 1 and 2 | Example 3 and 4 |
|---|---|---|
| Support Code | Degussa 4041 | Alcoa LD-5 |
| Surface Area, $m^2/g$ | 155 | 300 min |
| Pore Volume, cc/g | 0.9-1.0 | 0.63 |
| Bulk Density, g/cc | 0.4400-0.460 | 0.465 |
| $Al_2O_3$, % wt | <500 ppm | 99 |

TABLE 1-continued

Physical characteristics of the absorber supports

| Absorber support | Examples 1 and 2 | Example 3 and 4 |
|---|---|---|
| $S1O2$, % wt | >99.8 | 0.40 max |
| $Fe2O3$, % wt, max | <30 ppm | 0.04 |

Approximately 500 ml of the synthesized sorbent particles were enclosed between two glass wool zones and loaded into a down flow stainless steel absorber column. The absorber column was pretreated with a $N_2$ gas stream at a temperature of 130° C. for 2 hours. The acidic gas absorption mode was conducted at room temperature and a pressure of 100 psig. Two different gas streams were used to prepare a synthetic feed gas of a composition shown in Table 2, which is similar to the composition of the gas produced from the THAI™ process.

TABLE 2

Synthetic feed gas composition.

| Component | % by volume |
|---|---|
| $H_2$ | 1.83 |
| $O_2$ | 00 |
| $N_2$ | 75.41 |
| $CH_4$ | 5.49 |
| CO | 1.04 |
| $CO_2$ | 15.73 |
| $H_2S$ | 0.50 |

The stream 2,3 containing acidic gases was passed through the absorber column 7 with a flow of 330 ml/min and the breakthrough time of the acidic gases was determined by a micro gas chromatograph 11 equipped with an automated stream selection valve. Once the acidic gases broke though, the feed gas stream 2,3 was switched to a secondary absorber column system B and the primary absorber column 7 was purged with a $N_2$ gas stream 4 to remove the residual CO. Subsequently, the temperature of the absorber column 7 was increased gradually to 130° C. to free the adsorbed $H_2S$ and $CO_2$, and the pressure of the absorber column 7 increased from 100 psig to about 150 psig. The temperature of the absorber column 7 was kept fairly constant at a temperature of 130° C. to avoid the re-adsorption of the $H_2S$ and $CO_2$ during the circulation of the off-gas stream from the absorber column 7. The off-gas stream from the absorber column 7 was mixed with a continuous flow of air and the resultant gas mixture was then fed to an $H_2S$ direct oxidation reactor 16 via a gas circulating pump 12. The air flow was adjusted such that the ratio of oxygen to $H_2S$ was less than 0.5.

Figure 2:
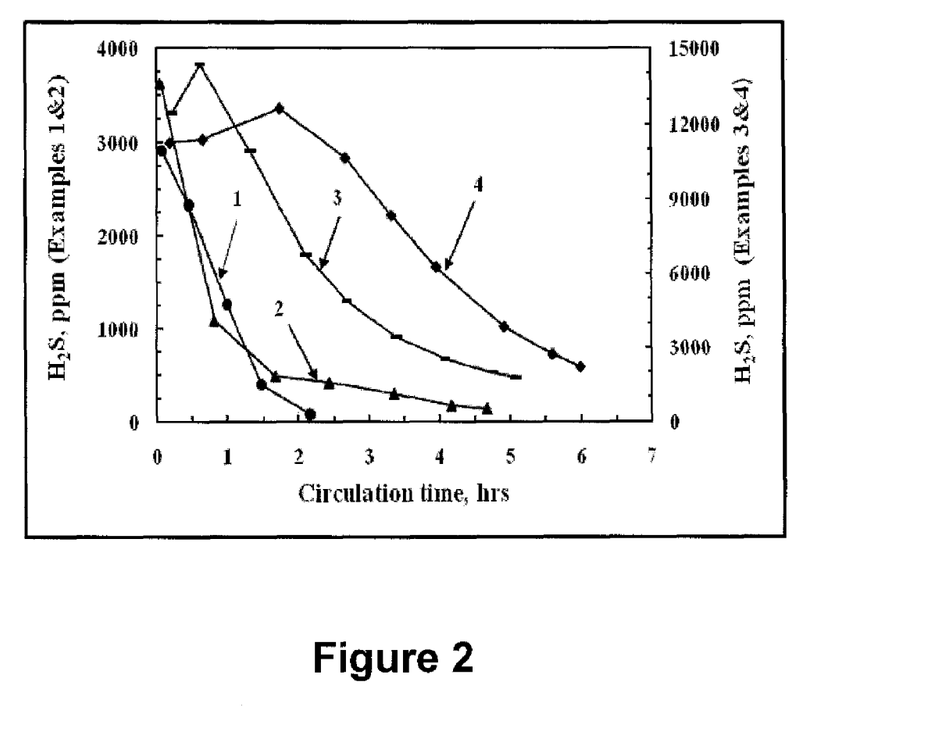
FIG. 2 is a schematic graph of the variation of $H_2S$ concentration in the recycle gas from the absorber column.

FIG. 2 (Line 1) shows the variation in the $H_2S$ concentration in the recycle gas stream from the absorber column 7 during the gas circulation step. At this point, the recycle gas stream from the absorber column 7 became the feed gas stream of the $H_2S$ direct oxidation reactor 16.

The $H_2S$ oxidation reactor 16 was loaded with 20 ml of an alumina-supported bismuth/copper oxidation catalyst and the $H_2S$ oxidation reaction was conducted at a temperature of 220° C. and a pressure of 100 psig. The flow rate of the feed gas stream of the oxidation reactor 16 was adjusted via a mass flow controller 13 mounted on the recycle gas stream from the circulating pump 12 to supply the feed gas stream to the $H_2S$ direct oxidation reactor 16 at a gas hourly space velocity of 1000 $hr^{-1}$. The produced fluid from the $H_2S$ oxidation reactor 16 entered a sulfur knockout separator 18 to remove the sulfur from the product gas stream. A 2μ stainless steel filter was also employed to capture the trace of the sulfur.

Figure 3:
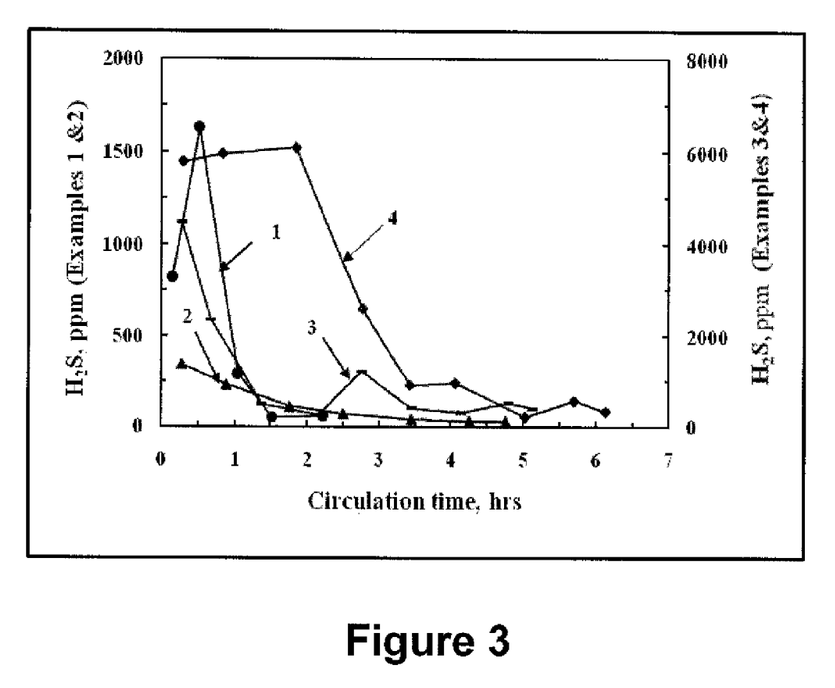
FIG. 3 is a schematic graph of the variation of $H_2S$ concentration in the recycle gas from the $H_2S$ direct oxidation reactor.
Figure 4:
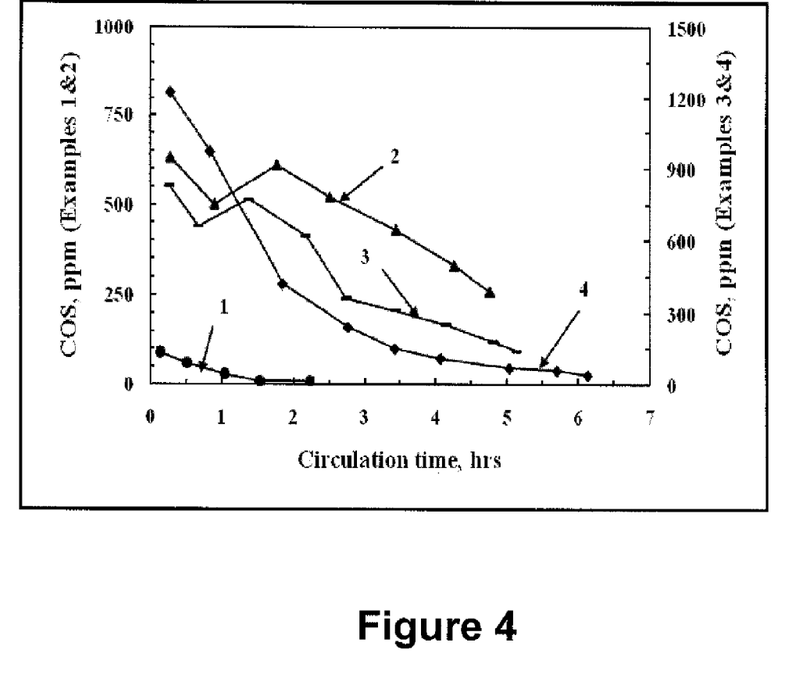
FIG. 4 is a schematic graph of the variation of COS concentration in the recycle gas from the $H_2S$ direct oxidation reactor.
Figure 5:
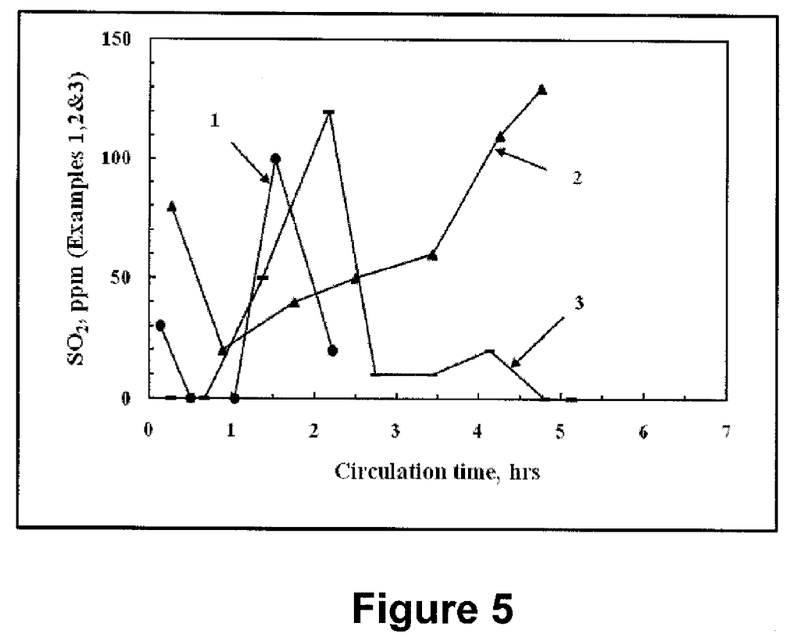
FIG. 5 is a schematic graph of the variation of $SO_2$ concentration in the recycle gas from the $H_2S$ direct oxidation reactor

FIGS. 3, 4 and 5 (Line 1) illustrate the variation in the $H_2S$, COS and $SO_2$ respectively in the product gas from the $H_2S$ direct oxidation reactor 16 during the circulation step. From FIGS. 4 and 5 (Line 1) small amounts of $SO_2$ and COS were produced as byproducts from the $H_2S$ oxidation reactor 16. The produced gas from the sulfur knockout separator 18 was passed through a humidifier comprising water at a temperature of 80° to increase the water partial vapor pressure as required for the hydrolysis of the COS present in the product gas. The humidified product gas was then recycled to the protective guard bed 6.

The productive guard bed 6 was loaded with 10 ml of pure alumina catalyst and operated at the same system pressure (about 100 psig) and at a temperature of 120° C. The outlet stream from the protective guard bed 6 was cooled down and then fed to the absorber column 7. The small amount of the COS produced during the $H_2S$ oxidation was hydrolyzed to $H_2S$, while $SO_2$ was reduced to elemental sulfur in the guard bed 6. Therefore, no COS or $SO_2$ was detected and $H_2S$ was the only sulfur compound in the off-gas stream from the guard bed 6. The off-gas steam from the protective guard bed 6 was then recycled to the absorber column 7. The gas circulation process was repeated until the $H_2S$ in the recycle gas was 10 ppm. Subsequently, the absorber column 7 at a temperature of 130° C., was purged with a $N_2$ gas stream 4 to avoid the re-adsorption of $CO_2$.

Example 2

As a further illustration of the First Embodiment, this Example is identical to Example 1 except the absorber column 7 was not purged to remove the residual CO after the acidic gas absorption step. FIGS. 2 and 3 (Line 2) respectively show the variation in the $H_2S$ concentration in the recycle gas stream from the absorber column 7 and from the oxidation reactor 16 during the gas circulation step. As a consequence of the presence of CO, a considerable amount of COS was produced during the $H_2S$ direct oxidation reaction, FIG. 4 (Line 2). In addition, a sudden increase in the $SO_2$ concentration was detected in the outlet gas stream of the $H_2S$ direct oxidation reactor toward the completion of the oxidation cycle, FIG. 5 (Line 2). This can be attributed to the sudden increase in the oxygen-to-$H_2S$ ratio toward the completion of the oxidation cycle. Nevertheless, no COS or $SO_2$ was detected in the recycle gas from the guard bed and the overall desulfurization process duration increased significantly due to the low sulfur selectivity during the $H_2S$ direct oxidation reaction to elemental sulfur.

Example 3

This is an illustration of the Second and Third Embodiments. This example is identical to Example 2 except that the acidic gas removal unit contained an amine based sorbent of high $H_2S$ selectivity and is suitable for COS hydrolysis to $H_2S$ and $CO_2$.

Synthesis of the Sorbent

The synthesis of the absorber was conducted by ordinary methods as practiced by those knowledgeable in the art. The amine based absorber support was Alumina spheres (LD-5) obtained from Alcoa. The physical characteristics of the support are shown in Table 1. Approximately, 25.5 g of 1,4-Diazabicyclo[2,2,2]-Octane was dissolved in acetone and the solution was added to 427.2 gm of the alumina support by the method of incipient wetness to achieve 5.6 wt. % amine in the final sorbent. The absorbent was left in the air to dry over night. Subsequently, the absorbent was loaded in the absorber column 7 and then conditioned at a temperature of 105° in a flow of nitrogen for 3 hours. The acidic gas absorption mode was conducted at room temperature and a pressure of 100 psig utilizing a gas stream of a composition similar to the gas stream employed in Examples 1 and 2. After the $H_2S$ has broken through, the absorber column 7 was conducted to a desorption mode at a temperature of 120° C.

The breakthrough time of the $H_2S$ from the acidic gas removal unit 7 increased significantly upon using the hindered amine based sorbent and therefore, the desulfurization step of the desorbed gas from the acidic gas removing unit 7 was expected to be longer than the acidic gas removal step. However, for a continuous sulfur removal process, the desulfurization step of the desorbed gas from the primary absorber column 7 was operated at low overall desulfurization efficiency and was deliberately terminated when the $H_2S$ in the recycle gas stream from the primary absorber column 7 was about 1750 ppm FIG. 2 (Line 3). Subsequently, the primary absorber column 7 was cooled down and therefore, the overall pressure of the system decreased 60 psig. The inlet feed stream of the $H_2S$ direct oxidation reactor 16 was then switched to the outlet gas stream from the secondary absorber column 7a. Meanwhile the primary absorber column 7 was cooled down further to room temperature and then conducted to a new acidic gas removal cycle. Similarly, no COS or $SO_2$ was detected in the recycle gas stream from the protective guard bed 6.

Example 4

This is an Illustration of the Fourth Embodiment

This example is identical to Example 3, except that the protective guard bed 6 (and 6a) was eliminated from the process. The oxygen to $H_2S$ ratio in the feed gas stream of the $H_2S$ oxidation reactor was adjusted to a ratio less than 0.5 to prevent the oxidation of $H_2S$ to $SO_2$. Therefore, no $SO_2$ was detected in the outlet gas stream during the desulfurization step. However, a considerable amount of the COS was detected in the recycle gas stream from the $H_2S$ direct oxidation reactor 16 FIG. 4 (line 4). The recycle gas stream from the oxidation reactor 16 was cooled down to a temperature of 50° C. to condense the produced sulfur and the moistened off-gas stream from the sulfur secondary separator was then recycled to the primary absorber column 7 to hydrolyze the produced COS to $H_2S$ and $CO_2$. Typically, the oxidation of $H_2S$ to elemental sulfur produces water (reaction 3), therefore, no additional water was required for the hydrolysis of the produced COS to $H_2S$ in the primary absorber column 7.

The invention claimed is:

1. A method of reducing the amount of sulfur compounds in an incoming gas stream and producing a $CO_2$ stream of high purity, the method comprising:
   i. providing a guard bed containing an hydrolysis catalyst for the conversion of COS and $CS_2$ to $H_2S$ and the reduction of $SO_2$ to elemental sulfur, and optionally also an RSH adsorbent suitable for RSH removal;
   ii. flowing said incoming gas stream through said guard bed to produce an effluent stream;
   iii. providing an acidic gas removal unit comprising an absorbent suitable for acidic gas absorption;
   iv. flowing said effluent stream from the guard bed over said absorbent in the acidic gas removal unit to produce a stream that is free of acidic gases, said absorbent becoming rich in acidic gases, v. applying an acidic-gas desorption mode to said acidic-gas rich absorbent to produce an acidic gas stream rich in acidic gases;

vi. introducing oxygen to said acidic gas-rich stream;

vii. providing a direct oxidation vessel containing a catalytic reaction zone comprising a catalyst suitable for catalyzing the oxidation of the $H_2S$ to sulfur wherein the temperature of the reaction zone is at or above the sulfur dew point at the reaction pressure;

viii. flowing said acidic gas-rich stream over said catalyst to produce a processed stream comprises a reduced level of said sulfur compounds when compared to the incoming effluent; and ix. recycling at least a portion of said processed stream of reduced sulfur compounds back to said guard bed and acidic gas removal unit.

2. A method according to claim 1, wherein water is added to said incoming gas stream prior to delivery of said incoming gas stream to said guard bed.

3. A method according to claim 1 wherein said sulfur compounds comprise one or more of COS, CS2, SO2, RSH and H2S.

4. A method according to claim 1 wherein said RSH adsorbent comprises activated carbon.

5. A method according to claim 1 wherein said hydrolysis catalysis includes one or more of alumina, titania or zirconia.

6. A method according to claim 1 wherein said guard bed is maintained in the range of from 20° C. to 300° C.

7. A method according to claim 1 wherein said acidic-gas removal sorbents include physical or chemical solvents for acidic-gas removal.

8. A method of claim 6 wherein said physical or chemical solvents are in liquid form or supported on porous support.

9. A method according to claim 1 wherein the acidic-gas absorption or adsorption mode is conducted at a temperature below 100° C.

10. A method according to claim 1 wherein the acidic-gas absorption or adsorption mode is conducted at a pressure of up to 1500 psig.

11. A method according to claim 1 wherein the method comprises a desorption step wherein acidic gas is desorbed from the sorbent.

12. A method according to claim 1 wherein the desorption step is conducted at a temperature at least 20° C. above the absorption or adsorption temperature.

13. A method according to claim 1, wherein the desorption step is conducted at a pressure up to 1500 psig.

14. A method according to claim 1 wherein the temperature of the reaction zone in the direct-oxidation vessel is in the range of 150° C. to 400° C.

15. The method according to claim 1 wherein the incoming gas stream to the direct oxidation vessel is at a gas hourly space velocity between 100 to 10,000 hr$^{-1}$.

16. The method according to claim 1 wherein the pressure in the reaction zone in the direct oxidation vessel is between 15 and 500 psig.

17. The method as claimed in claim 1, wherein said sorbent suitable for acid gas absorption comprises an amine based sorbent of high selectivity toward $H_2S$.

18. The method as claimed in claim 17, wherein said amine based sorbent of high selectivity toward $H_2S$ comprises one or more of N-methylpyrrolidone (NMP)/dodecane, 1,4-Diazabicyclo[2,2,2]-Octane and diisopropanolamine.

19. A method of reducing the amount of sulfur compounds in an incoming gas stream, wherein said sulfur compounds comprise one or more of COS, $CS_2$, $SO_2$, and $H_2S$, comprising the steps of:

i. providing a guard bed containing an hydrolysis catalyst for the conversion of COS and $CS_2$ to $H_2S$ and the reduction of $SO_2$ to elemental sulfur;

ii. flowing said incoming gas stream through said guard bed, to produce an effluent stream;

iii. providing an acidic gas removal unit comprising an absorbent suitable for acidic gas absorption;

iv. flowing said effluent stream from the guard bed over said absorbent in the acidic gas removal unit to produce a stream that is free of acidic gases, said absorbent becoming rich in acidic gases, v. applying an acid gas desorption condition to said acidic-gas rich absorbent to desorb acid gases therefrom and to produce an acidic gas stream rich in acidic gases and containing $H_2S$;

vi. introducing oxygen to said acidic gas-rich stream;

vii. providing a direct oxidation vessel containing a catalytic reaction zone comprising a catalyst suitable for catalyzing the oxidation of the $H_2S$ to sulfur wherein the temperature of the reaction zone is at or above the sulfur dew point at the reaction pressure;

viii. flowing said acidic gas-rich stream over said catalyst to produce a processed stream comprising a reduced level of said sulfur compounds when compared to the acidic gas-rich stream; and ix. recycling at least a portion of said processed stream back to said guard bed and acidic gas removal unit.

20. The method as claimed in claim 19, further comprising the steps of:

adding water to said incoming gas stream prior to passing said incoming gas stream through said guard bed; and said step of applying said acid gas desorption condition comprising the step of applying heat to said absorbent to raise it to a temperature of approximately 130° C.

21. The method as claimed in claim 19, further comprising the step of, after step v, purging the acid gas removal unit with a gas stream to remove residual CO.

22. The method as claimed in claim 19, further comprising the step of, at approximately the time of applying an acid gas desorption condition to said acidic-gas rich absorbent, redirecting said incoming gas stream to a secondary guard bed and thereafter to a secondary acidic gas removal unit.

23. A system for of reducing the amount of sulfur compounds in an incoming gas stream and producing a $CO_2$ stream of high purity, such system comprising:

i. a guard bed containing an hydrolysis catalyst, said hydrolysis catalyst adapted for the conversion of COS and $CS_2$ to $H_2S$ and the reduction of $SO_2$ to elemental sulfur, and optionally also an RSH adsorbent suitable for RSH removal, said guard bed adapted to receive said incoming stream and produce an effluent stream after passage of said incoming stream through said guard bed;

ii. an acidic gas removal unit comprising an absorbent suitable for acidic gas absorption, adapted to receive said effluent stream and produce a produced stream that is free of acidic gases, said absorbent becoming rich in acidic gases;

iii. said absorbent adapted, when said having heat applied thereto, to produce an acidic gas stream rich in acidic gases;

iv. oxygen supply means, adapted to supply oxygen to said acidic gas stream;

v. a direct oxidation vessel, adapted to receive said acidic stream rich in acidic gases and oxygen, and containing a catalytic reaction zone comprising a catalyst suitable for catalyzing the oxidation of the $H_2S$ to sulfur wherein the temperature of the reaction zone is at or above the sulfur dew point at the reaction pressure, and to produce a processed stream comprising a reduced level of said sulfur compounds when compared to the incoming acidic stream; and vi. recycling piping to recycle at least a portion of said processed stream back to said guard bed and acidic gas removal unit.

24. The system as claimed in claim 23, wherein said sulfur compounds comprise one or more of COS, CS2, SO2, RSH and H2S.

25. The system as claimed in claim 23 wherein the RSH adsorbent comprises activated carbon.

26. The system as claimed in claim 23, wherein the hydrolysis catalysis includes one or more of alumina, titania or zirconia.

27. The system according to claim 23 wherein said acidic-gas removal sorbents include physical or chemical solvents for acidic-gas removal.

28. The system according to claim 23 wherein said physical or chemical solvents are in liquid form or supported on porous support.

29. The system as claimed in claim 23, wherein said absorbent suitable for acidic gas absorption comprises an amine based sorbents.

30. The system as claimed in claim 29, wherein said amine based sorbent comprises one or more of to 1,4-Diazabicyclo[2,2,2]-Octane, 1,5-Diazabicyclo[5,4,0]-Undec-5-ene, 1,4-dimethylpiperazin-2-one and 1,5-Diazabicyclo[4,3,0]-non-5-ene.

* * * * *